(12) United States Patent
Neumann et al.

(10) Patent No.: US 7,479,350 B1
(45) Date of Patent: Jan. 20, 2009

(54) PASTY MATERIALS WITH NANOCRYSTALLINE MATERIALS FOR ELECTROMECHANICAL COMPONENTS AND LAYERS AND ELECTROMECHANICAL COMPONENTS WITH SAID MATERIALS

(75) Inventors: Gerold Neumann, Halstenbeck (DE); Peter Birke, Itzehoe (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/959,169

(22) PCT Filed: Apr. 18, 2000

(86) PCT No.: PCT/EP00/03541

§ 371 (c)(1),
(2), (4) Date: Jan. 14, 2002

(87) PCT Pub. No.: WO00/63984

PCT Pub. Date: Oct. 26, 2000

(30) Foreign Application Priority Data

Apr. 19, 1999 (DE) .................................. 199 17 581
Oct. 8, 1999 (DE) .................................. 199 48 548

(51) Int. Cl.
*H01M 8/00* (2006.01)
(52) U.S. Cl. ...................................... 429/217; 29/623.1
(58) Field of Classification Search ................ 29/623.1; 429/217, 309, 314, 317

See application file for complete search history.

(56) References Cited

U.S. PATENT DOCUMENTS 5,009,970 A    4/1991   Kronfli et al.
(Continued)

FOREIGN PATENT DOCUMENTS

DE    198 39 217    3/2000
(Continued)

OTHER PUBLICATIONS

A. Blyr, et al., *Origin of Self-Discharge Mechanism in LiMn$_2$O$_4$-based Li-ion Cells: A Chemical and Electrochemical Approach*, 4th Euroconference on Solid State Ionics, Connemara, Ireland, Sep. 1997, 12 pages.
(Continued)

*Primary Examiner*—Patrick Ryan
*Assistant Examiner*—Monique Wills
(74) *Attorney, Agent, or Firm*—Duane Morris LLP (57) ABSTRACT

The present invention relates to a paste-like mass that can be used in electrochemical structural elements comprising (A) 0-70% by weight of a matrix containing or consisting of at least one organic polymer, precursors thereof, or prepolymers thereof, and (B) 30-100% by weight of an electrochemically activatable inorganic material that is preferably not soluble in the matrix and that is in the form of a solid substance, and additionally, if necessary, a suspending agent for (B), characterized in that said electrochemically activatable material is at least partially a nanocrystalline powder, with the proviso that said material (B) is not a material that can be used as electrode material in the absence of (A). Said mass is suitable for producing layers that are self-supporting or that are placed on a substrate from which or with which composite layers with electrochemical properties can be produced, such as accumulators, batteries, condensators (supercaps), solar cells and electrochromic indicating elements. The invention also discloses methods for producing the masses, layers, and composite layers.

26 Claims, 3 Drawing Sheets

U.S. PATENT DOCUMENTS

| | | | |
|---|---|---|---|
| 5,041,346 | A | 8/1991 | Giles |
| 5,456,000 | A | 10/1995 | Gozdz et al. |
| 5,470,910 | A | 11/1995 | Spanhel et al. |
| 5,569,561 | A * | 10/1996 | Exnar et al. ............ 429/335 |
| 6,503,284 | B1 * | 1/2003 | Liu et al. ............ 29/623.1 |

FOREIGN PATENT DOCUMENTS

| | | |
|---|---|---|
| EP | 0 404 578 | 12/1990 |
| EP | 0 501 187 | 9/1992 |
| EP | 0 517 069 | 12/1992 |
| EP | 0 528 557 | 2/1993 |
| WO | WO 97/38458 | 10/1997 |
| WO | WO 98/23796 | 6/1998 |
| WO | WO 99/04441 | 1/1999 |

OTHER PUBLICATIONS

K. Zaghib, et al., *Electrochemical Study of $Li_4Ti_5O_{12}$ as Negative Electrode for Li-ion Polymer Rechargeable Batteries*, Journal of Power Sources, 1999, pp. 300-305.

A.C. Pierre, et al., *$TiO_2$-Polymer Nano-Composites By Sol-Gel*, Active and Passive Elec. Comp., vol. 18, 1995, pp. 31-37.

G. Campet, et al., *PLR (Plastic Lithium Rechargeable) Batteries Using Nanoscale Materials: A Convenient Source of Electrical Energy for the Future*, Bull. Korean Chem. Soc., vol. 220, No. 1, 1999, pp. 885-892.

Chambers, et al., *Hydrogen Storage in Graphite Nanofibers*, The Journal of Physical Chemistry B, vol. 102, No. 22, May 28, 1998, pp. 4253-4256.

Tsunemi, et al., *A Mechanism of Ionic Conduction of Poly (Vinylidene Fluoride)-Lithium Perchlorate Hybrid Films*, Electrochimica Acta., vol. 8, No. 6, 1983, pp. 833-837.

Tsuchida, et al., *Condution of Lithium Ions in Polyvinylidene Fluoride and Its Derivatives—I*, Electrochimica Acta., vol. 28, No. 5, 1983, pp. 591-595.

G.X. Wang, et al., *Nanocrystalline NiSi alloy as an Anode Material for Lithium-ion Batteries*, Journal of Alloys and Compounds, 306, 2000, pp. 249-252.

International Search Report.

International Preliminary Examination Report.

Jie Guan and Meilin Liu, Transport Properties fo LiMn2O4 Electrode Materials for Lithium-ion Batteries, Solid State Ionics, (1998), pp. 21-28.

* cited by examiner

PASTY MATERIALS WITH NANOCRYSTALLINE MATERIALS FOR ELECTROMECHANICAL COMPONENTS AND LAYERS AND ELECTROMECHANICAL COMPONENTS WITH SAID MATERIALS

The present invention relates to novel materials with electrochemical properties, in particular paste-like masses, layers produced from these paste-like masses that are self-supporting or that are placed on a substrate, and composite layers produced therefrom that can be used as batteries, accumulators, capacitors (supercaps), solar cells, electrochromic indicating elements, or the like. The invention particularly relates to to rechargeable electrochemical cells on a fixed body base.

Since the beginning of the 1970's there have been attempts to produce electrochemical elements such as accumulators or the like in the form of thin layers. The goal has been to obtain composite films that are both flexible enough that they can be, for instance, rolled up or made to conform to another desired shape and that also have particularly good charging and discharging properties due to an extremely high contact area between the individual electrochemical components, such as electrodes and electrolytes, relative to the volume of active electrochemical material used.

In the past, attempts to produce such electrode materials have begun with solid or viscous Teflon, which is mixed with a certain percentage of carbon and the actual electrode material and is then pressed or sprayed onto suitable contact electrodes. However, this results in layers that have insufficient flexibility. In addition, it has been suggested that electrode layers be produced that are manufactured with PVC and tetrahydrofurane or another polymer dissolved in a solvent and that the solvent subsequently be extracted therefrom. However, the conductivity of products produced in this manner is not favorable.

Producing a layer that can function in an appropriate electrochemical composite as an electrolyte presents particular problems. U.S. Pat. No. 5,456,000 describes rechargeable battery cells that are produced by laminating electrode and electrolyte cells. Used for the positive electrode is a film or membrane that is produced separately from $LiMn_2O_4$ powder in a matrix solution made of a copolymer and is then dried. The negative electrode comprises a dried coating of a pulverized carbon dispersion in a matrix solution of a copolymer. An electrolyte/separator membrane is arranged between the electrode layers. For this purpose a poly(vinylidene fluoride)-hexafluoropropylene copolymer is converted with an organic plasticizer such as propylene carbonate or ethylene carbonate. A film is produced from these components and then the plasticizer is extracted from the layer. The battery cell is maintained in this "inactive" condition until it is to be used. In order to activate it, it is immersed in a suitable electrolyte solution, whereby the cavities formed by extracting the plasticizer are filled with the liquid electrolytes. The battery is then ready for use.

Such a construct is disadvantageous in that the battery cannot be maintained for extended periods in a charged condition because corrosion occurs at the limit surfaces (see oral presentation made by A. Blyr et. al., 4th Euroconference on Solid State Ionics, Connemara, Ireland, September 1997, provided for publication). The use of a liquid electrolyte thus entails stability problems at the phase limits in the composite layer. Another disadvantage is that the battery must be arranged in a housing that is leak-proof.

There have already been attempts to use solid electrolytes. It has been suggested that ion-conducting organic polymer materials be used (so-called true polymer electrolytes). Thus, U.S. Pat. No. 5,009,970 describes using a gel product that is obtained by converting a solid poly(ethylene oxide) polymer with lithium perchlorate and then irradiating it. U.S. Pat. No. 5,041,346 describes an oxymethylene cross-linked variant of these polymer electrolytes that also contains a softener that preferably has ion-solvating properties, for example, that can be a dipolar aprotic solvent such as g-butyrolactone. However, it has been reported that although the ion conductivity compared to pure solid lithium salt is drastically elevated, it is still not sufficient for use as an electrolyte layer in electrochemical elements.

Another attempt related to similar polymer electrolytes. In this case polyvinylfluoride polymers and related fluorocarbon copolymers were used with trifluoroethylene or tetrafluoroethylene. Added to these polymers were lithium salts and additional organic solvents that were compatible both with the polymers and with the salt components (Tsuchida et. al., Elektrochimica Acta, Volume 28 (1983, page 591 ff and page 833 ff). However, in this case a usable ion conductivity of greater than about $10^{-5}$ S/cm can only be obtained at elevated temperatures because, as the authors themselves reported, this mixture did not remain homogeneous; rather, it formed salt and polymer crystallite. Research in this direction was therefore later deemed unpromising (see U.S. Pat. No. 5,456,000, column 2, lines 31 through 33).

German patent application 198 39 217.6 filed Aug. 28, 1998 discloses paste-like masses which are suitable for electrochemical structural elements of the type mentioned above. Said masses comprise a heterogeneous mixture of (A) a matrix containing or comprising at least one organic polymer, precursors thereof, or prepolymers thereof, and (B) an electrochemically activatable inorganic material that is not soluble in said matrix and that is in the form of a solid substance, whereby either (a) said mass comprises at least 60 vol. % (B) and, if (B) is an electrode material, (B) is worked into said matrix (A) without the assistance of a solvent or swelling agent for said organic polymer, its precursors, or its prepolymers or (b) said mass comprises at least approximately 60 vol. % (B) and, if (B) is an electrode material, can be produced in that (B) is worked into a matrix (A) that also contains a plasticizer for said organic polymer, and said plasticizer is subsequently removed using a suitable solvent, and/or (c) said mixture also contains (C) a solid ion electron and/or mixed conductor that is different from (B) and that is present at least at the grain limits between (A) and (B) as a thin layer. From said masses, self-supporting layers or layers that are placed on a substrate can be produced. Composite layers with electrochemical properties or electrochemical cells can be produced from a suitable sequence of said layers or of at least one such layer in connection with other suitable layers.

The object of the present invention is to provide masses for producing electrochemical elements in the form of thin composite layers that do not have the aforesaid unfavorable properties. In particular the inventive masses, when processed into layers or composite layers with electrochemical properties, should provide products such as rechargeable batteries (accumulators), electrochromic structural elements, or the like, that have a high degree of flexibility and very good electron- and ion-conducting properties and that furthermore cannot leak and therefore do not have to be maintained in housings, especially in sealing housings.

In accordance with the invention, paste-like masses that can be used in electronic structural elements are provided that include (A) 0-70% by weight of a matrix containing or consisting of at least one organic polymer, precursors thereof, or prepolymers thereof, and (B) 30-100% by weight of an inorganic material that can be electrochemically activated, is not soluble in the matrix, and is in the form of a solid substance. At least when said component (A) is not present, said inventive mass further contains a suspending agent.

The term "that can be used in electrochemical structural elements" implies that the electrochemically activatable inorganic material that is in the form of a solid substance must be an ion-conducting and/or electron-conducting material that is suitable for electrode material or for a solid electrolyte.

In accordance with the invention at least one additional condition must be satisfied so that there is improved electrical contact between the individual grains of the electrochemically activatable solid substance (B) that is embedded in the matrix (A). Namely, it has been demonstrated that the poor conductivity described in the prior art can be overcome if certain criteria are observed. Examples for this are disclosed in DE 98 39 217.6. In accordance with the invention it has been found that the properties of such masses or of the electrochemical structural elements produced therefrom can further be improved by providing said electrochemically activatable inorganic material (B) that is not soluble in the matrix at least partially in the form of a nanocrystalline powder. Nanocrystalline materials are understood to be materials the grain sizes of which are less than 10 μm, preferably in the range of 1 μm, more preferably in the range of 1-100 nm. Said powders may also be designated as X-ray amorphous materials.

The advantages of using nanocrystalline titanium dioxide in an electrode have already been pointed out in the U.S. Pat. No. 5,569,561. Said patent describes the increase in capacity and the ability of rapid charge of primary and secondary lithium systems as being a result of sintering nanocrystalline electrode material that is provided as precursor in a colloidal suspension. Said electrode is provided for a system with a liquid-based electrolyte. In another publication (Journal of Physical Chemistry, Vol. 102, 22, 1998), the advantages of using nanocrystalline carbon in the negative electrode has been described.

It is particularly preferred to produce the present paste-like masses with nanocrystalline solid electrolytes and to use them as solid body ion conductors in electrochemical composite layer systems of the aforementioned type, whereby layers with an electrochemically activatable material that consists at least partially of a nanocrystalline powder may serve as positive and/or negative electrode.

The basic advantages of solid electrolyte systems and their advantageous processing into lithium cells are described in the mentioned DE 198 39 217.6 and are explained in more detail further below.

The already mentioned DE 198 39 217.6 describes an embodiment according to which the conducting mechanism of the lithium ions in the electrolyte materials is based on the use of two different electrolytes, one of said electrolytes being soluble in a solvent, the other, however, being insoluble. Once the solvent has dried out, the grains of the insoluble electrolyte take over the bulk conductivity of the lithium ions, whereas the soluble electrolyte takes over the conduction across the grain limits by deposition at all grain limits. The movement of the lithium ions is effected by exchange processes in the lattice of the two electrolyte components.

In accordance with the invention it has been found that the aspired conductivity can also be obtained and further improved by providing the material (B) (i.e. the electrolyte) at least partially in the form of a nanocrystalline powder. Therefore, a preferred embodiment of the invention relates to masses and layers containing electrolyte materials.

The use of nanocrystalline materials that are suitable as solid electrolytes has a series of advantages. Thus, it is to be noted that the ionic conductivity of solid electrolytes is effected by exchange processes in the lattice. Therefore, the number of lattice positions in thermodynamic balance decisively determines the diffusion coefficient. The higher the number of vacant lattice positions, the higher is the diffusion coefficient and the smaller is the ionic resistance of the electrolyte. By providing additional internal surfaces in the electrolyte layer by way of providing nanocrystalline grains, the number of vacancies for improving the ionic conductivity beyond the concentration present in the solid body is increased. A surface itself contains an increased concentration of vacancies relative to the inside of a solid body. This manifests itself in the effect known from the pertinent literature that surface diffusion proceeds by a number of magnitudes faster than solid body diffusion. Thus, an effect of the invention is among others that the ion mobility is very high due to providing large internal surfaces as a result of the vacancy diffusion mechanism.

The electrode materials in accumulators are mixed conductors, i.e. they have to possess ionic and electronic conductivity. Providing electrodes by partially adding nanocrystalline materials has cost and industrial engineering advantages relative to providing them completely on the basis of nanocrystalline materials. The nanocrystalline material takes over transportation of the ions or electrons between the normal crystalline grains and simultaneously acts as an improving adherence agent between the grains.

A suitable volume mixture of nanocrystalline electrode or electrolyte material with normal crystalline material results in an optimized distribution in relation to the bulk and is of advantage for the volumetric density of energy and an optimum configuration of electron and ion conduction paths. Thus, it is desirable in most cases that at least 30% by weight of the electrochemically activatable material (B) be present in a nanocrystalline form. Preferably, said portion is at least 50% by weight. In some embodiments, said portion may even be higher, e.g. about 70% by weight and more.

Surprisingly, it has further turned out that working the remaining components into the paste-like mass is rendered uncritical when nanocrystalline materials as described above are used. Thus, it could be found that due to strong cohesion or adhesion properties, said nanocrystalline material confers a high degree of suppleness and bonding capacity to said paste-like masses. Consequently, depending on the portion of nanocrystalline material provided, only very small quantities of the proportion of said matrix (A) that contains or consists of at least one organic polymer, its precursors or its prepolymers have to be worked in. In an extreme case, e.g. when said electrochemically activatable material (B) consists to a large extent or even completely of nanocrystalline powder (which can be advantageous in some cases), the portion of said matrix (A) in the sum of (A)+(B) may decrease to less than 10 vol.-%, preferably to less than 5 vol.-%, more preferably to less than 2 vol.-%. An increase in energy density results therefrom. In an extreme case, said matrix (A) may be completely absent without said mass loosing its paste-like consistency or without appreciable losses of the mechanical flexibility of the electrode or electrolyte layers ("tapes") produced therefrom occurring. The detected adhesive effect of $Li_{0.5}Si_{0.5}P_{0.5}O_4$ is an example. Said effect may be achieved particularly for electrolytes over glass-like starting substances that have an enormous adhesive effect after being pulverized to particle sizes of considerably less than 1 μm, for instance in a suitable trituration mill.

For the remaining cases, it is recommended that the portion of said matrix (A) be not more than 50 vol. %, preferably not more than 35 vol. %, more preferably not more than about 30 vol. % and particularly preferably not more than about 20 vol. %.

Further, it is to be noted that said component (B) does not have to consist exclusively of said nanocrystalline material, as has already been mentioned above. Said nanocrystalline material can also differ chemically from the non-nanocrystalline component (B), but does not have to do so.

Nanoparticle-sized grains may be produced by precipitation reactions such as co-precipitation. A method of producing mixtures of electrochemically active layers by including normal-crystalline and nanocrystalline materials comprises mixing the standard electrode material with a precipitating liquid. After effecting the precipitation reaction and filtering or sedimentating the solid body out of the liquid, a mixture of nanocrystalline material and standard material is obtained. Said mixture is particularly advantageous also because the nanocrystalline material fills the cavities between the normal crystalline material and thus increases the density and hence the cohesion of the layer and the corresponding electrochemical properties.

A further improvement of the electrical contact between the grains of the solid substance (B) may additionally be obtained, if necessary, by using a further ion and/or electron conductor (or a homogeneous mixed conductor, depending on the required kind of conductivity) (C), that is soluble in the solvent/swelling agent or plasticizer for the matrix (A) and that deposits as a thin layer at least at the grain limits between (A) and (B) by evaporating or expelling the solvent/swelling agent or by extracting the plasticizer during manufacturing the paste.

Except for the case already mentioned that the paste-like mass comprises 100% of nanocrystalline solid substance (B), it obtains its paste-like consistency by using a suitable matrix (A). The term "paste-like" means that the mass, once it has been produced, can be processed using current paste application methods, for example, it can be applied to a base using a brush, spatula, rake, or various pressure methods. Depending on the need, the mass can be made to be relatively thin to very viscous.

A plurality of materials can be used for the matrix (A). Systems containing solvents or solvent-free systems can be used. Solvent-free systems that are suitable are, for example, cross-linkable liquid or paste-like resin systems. Examples are resins made of cross-linkable addition polymers or condensation resins. For instance, pre-condensates of phenoplasts (novolak) or aminoplasts can be used that are finally cross-linked to the layer of an electrochemical composite layer after the paste-like mass has been formed. Additional examples are unsaturated polyesters, such as polyester that can be cross-linked to styrene by graft copolymerization, epoxy resins that are bifunctional reaction partner curable (for example bisphenol A epoxy resin, cold cured with polyamide), polycarbonates that can be cross-linked such as polyisocyanurate that can be cross-linked by a polyol, or binary polymethyl methacrylate, which can also be polymerized with styrene. The paste-like mass is formed from the more or less viscous precondensate or non-cross-linked polymer for matrix (A) or using essential components thereof, together with the component (B).

Another option is to use polymers or polymer precursors together with a solvent or swelling agent for the organic polymer. In principle there is no limit in terms of the synthetic or natural polymers that can be used. Not only can polymers with carbon main chains be used, but also polymers with heteroions in the main chain, such as polyamides, polyesters, proteins, or polysaccharides. The polymers can be homopolymers or copolymers. The copolymers can be statistical copolymers, graft copolymers, block copolymers, or polyblends, there is no limitation. In terms of polymers with a pure carbon main chain, natural or synthetic rubbers can be used, for instance. Particularly preferred are fluorinated hydrocarbon polymers such as Teflon, poly(vinylidene fluoride) (on PVDF) or polyvinyl chloride, since these make it possible to obtain particularly good water-repellant properties in the films or layers formed from the paste-like mass. This imparts particularly good long-term stability to the electrochemical elements thus produced. Additional examples are polystyrene or polyurethane. Examples of copolymers are copolymers of Teflon and of amorphous fluoropolymers, and poly(vinylidene fluoride)/hexafluoropropylene (commercially available as Kynarflex). Examples of polymers with heteroatoms in the main chain are polyamides of the diamine dicarboxylic acid type or of the amino acid type, polycarbonates, polyacetals, polyethers, and acrylic resins. Additional materials include natural and synthetic polysaccharides (homeoglycans and heteroglycans), proteoglycans, for example, starch, cellulose, methylcellulose. In addition, substances such as chondroitin sulfate, hyaluronic acid, chitin, natural or synthetic wax, and many other substances can be used. In addition, the aforesaid resins (precondensates) can be used in solvents and diluents.

One skilled in the art is familiar with solvents and swelling agents for the aforesaid polymers.

A plasticizer (also softener) can be present for the polymer or polymers used regardless of whether or not the matrix (A) contains a solvent or swelling agent. "Plasticizer" or "softener" should be understood to include substances whose molecules are bonded to the plastic molecules by coordinate bonds (Van der Waals forces). They thus diminish the interacting forces between the macromolecules and therefore lower the softening temperature and the brittleness and hardness of the plastics. This is different from swelling agents and solvents. Due to their higher volatility, it is generally also not possible to remove them by evaporating them out of the plastic. Rather, they must be extracted using an appropriate solvent. Using a plasticizer effects high mechanical flexibility in the layer that can be produced from the paste-like mass.

One skilled in the art is familiar with suitable softeners for each of the plastics groups. They must be highly compatible with the plastic into which they are to be worked. Common softeners are high-boiling esters of phthalic acid or phosphoric acid, such as dibutyl phthalate or dioctyphthalate. Also suitable are, for instance, ethylene carbonate, propylene carbonate, dimethoxyethane, dimethylcarbonate, diethyl carbonate, butyrolactone, ethylmethylsulfon, polyethylene glycol, tetraglyme, 1,3-dioxolane, or S,S-dialkyldithiocarbonate.

If a combination of plastic and plasticizer is used for the matrix, the plasticizer can then be extracted from the paste-like mass using an appropriate solvent. The cavities that now occur are closed during the subsequent conversion of the mass into an electrochemically active or activatable layer by pressure or laminating processes for combining the various layers. This improves the electrochemical stability of the charged accumulator. When a solid electrolyte is used in the described plastic matrix it is desirable to achieve ionic conductivity of at least $10^{-4}$ cm$^{-1}$.

Instead of later compressing the cavities, they can also be filled with a second solid electrolyte or electrode material once the plasticizer has been extracted.

For manufacturing the paste, the described polymers or polymer precursors may be combined together with the solvent or swelling agent, the non-nanocrystalline portion of component (B) and the nanocrystalline powder and thoroughly mixed in an appropriate manner. When subsequently said solvent or swelling agent is removed, the nanocrystalline component can deposit on the grain surface of the non-nanocrystalline electrolyte and thus decisively improve the contact between the grains of said non-nanocrystalline electrolyte. The particular advantage with respect to the variant described in DE 198 39 217.6 is that the nanocrystalline electrolyte is not required to be soluble in the solvent for preparing the paste. Therefore, nanocrystalline insoluble solid electrolytes can be used such as they can be selected for the non-crystalline electrolyte. The class of insoluble solid electrolytes is characterized by having a higher ion conductivity than the class of soluble electrolytes. Thus, the application of insoluble nanocrystalline solid electrolytes improves the grain limit contact by a very well conducting second solid electrolyte which results in a reduced ionic resistance of the electrolyte, as it is desirable for a large number of applications.

As stated in the foregoing, these inventive paste-like masses and layers produced therefrom are suitable for a plurality of electrochemical elements, such as accumulators, batteries, supercaps or electrochromic indicating elements. One skilled in the art can select the same solid substances (B) that he would use for classic electrochemical elements, that is, substances to which no plastics have been added.

The following solid substances (B) are examples of options that can be used for lithium-technology accumulators:

| | |
|---|---|
| lower contact electrodes | Al, Cu, Pt, Au, C |
| positive electrode | LiF, $Li_xNiVO_4$, $Li_x[Mn]_2O_4$, $LiCoO_2$, $LiNiO_2$, $LiNi_{0.5}Co_{0.5}O_2$, $LiNi_{0.8}Co_{0.2}O_2$, $V_2O_5$, $Li_xV_6O_{13}$ |
| electrolyte (solid body, in this case) | $Li_{1.3}Al_{0.3}Ti_{1.7}(PO_4)_3$, $LiTaO_3 \cdot SrTiO_3$, $LiTi_2(PO_4)_3 \cdot xLiO$, $Li_4SiO_4 Li_3PO_4$, LiX + ROH where x = 0-0.3 and X = Cl, Br, I (1, 2 or 4 ROH per LiX) |
| negative electrode | Li, $Li_{4+x}Ti_5O_{12}$, $Li_xMoO_2$, $Li_xWO_2$, $Li_xC_{12}$, $Li_xC_6$, lithium alloys |
| upper contact electrodes | Al, Cu, Mo, W, Ti, V, Cr, Ni |

However, of course, the present invention is not limited to lithium-technology accumulators, but rather, as stated in the foregoing, includes all systems that can be produced using "conventional" technology, that is, without working in an organic polymer matrix.

The use of nanocrystalline materials in electrodes and electrolytes thus provides the option of considerably improved kinetics, particularly in a composite layer with accumulator properties. This is based on the fact that the grain size is the determining path-length for diffusion, not the layer thickness. This has an advantageous effect on a reduction of the internal resistance, which in turn allows for instance rapid charge and discharge ability. The processing of solid electrolytes and electrode materials, such as they are used in lithium systems, in an at least partially nanocrystalline form therefore results in significantly improved electric properties. Thus, the grain contact improves the electronic properties.

The following describes a few special embodiments of the paste-like masses that are suitable for special structural elements or element parts. For those electrochemically activatable parts that are not prior art, it should be clear that these substances can also be used in "bulk form", i.e., without the polymer matrix or without nanocrystalline components, respectively, in appropriate electrochemical structural elements.

Appropriately selecting the electrochemically active substances makes it possible to produce electrochemical elements, such as accumulators, whose characteristics in the charge/discharge curves make it possible to control the charge/discharge status of the accumulator. Thus mixtures of two of the electrode materials cited in the forgoing, or of other appropriate electrode materials, can be used for the electrochemically activatable solid substance (B) for the positive or negative electrodes, the mixtures having different oxidation and reduction stages. Alternatively one of the two substances can be replaced with carbon. This leads to characteristic segments in the charge/discharge curves that make it possible to advantageously detect the charge or discharge status of an accumulator produced using such masses. The curves have two different plateaus. If the plateau that is near the discharge status is achieved, this status can be indicated to the user so that he knows that he will soon need to recharge, and vice versa.

If carbon and an element that can be alloyed with lithium is worked into a paste-like mass provided for a negative electrode, this imparts to the electrode that can be produced therefrom (with properties of an alloy electrode or intercalation electrode) a particularly high capacity that has improved electrochemical stability. In addition, the expansion in volume is lower than in a pure intercalation electrode.

Furthermore, graphite or amorphous carbon (carbon black) or a mixture of the two can be worked into the paste-like mass with electrode material for a positive or negative electrode. Particularly advantageous in this regard are weight proportions of 20 to 80% by weight amorphous carbon relative to the electrochemically activatable component. If the mass is provided for a positive electrode, the lubricating effect of the carbon is an advantageous property that improves the mechanical flexibility of a layer produced from the paste-like mass. If the mass is provided for a negative electrode, additionally the electrochemical stability and electronic conductivity is improved, as has been described in the foregoing.

The inventive paste-like mass can also be used for electrodes other than intercalation electrodes. For a series of electrode materials, both on the negative side and on the positive side of an accumulator, reactions may selectively be induced that cause a decomposition at the grain surface. A new electrolyte or a second compound is formed that also has the properties of an electrode material like the basic material. If the surface of the grains of the material converted in such a manner was for instance completely converted into an electrolyte, the electronic conductivity necessary for the function as an electrode is inhibited. In order to avoid such a passivation by formation of closed layers, nanocrystalline carbon which despite a partial passivation of the surface still provides a sufficient number of electric contacts may be admixed prior to the conversion reaction. In the following, examples are given for the mentioned conversion reactions:

I. Negative Electrode

A. $LiNO_3 + 8 Li \rightarrow Li_3N + 3 Li_2O$ or

B. $LiPF_6 + 8 Li \rightarrow Li_3P + 6 LiF$

II. Positive Electrode

A. LiI+LiCoO$_2$→LiCO$_{0.5}$I$_{0.5}$O

A further example of this is the use of metal powder, particularly having especially adapted surfaces such as metal flakes (e.g. nickel flakes or copper flakes), combined with an alkali or earth alkali salt as the electrochemically activatable solid substance (B). A paste-like mass produced with this combination can be used to produce decomposition electrodes. The expansion in volume that is typical for intercalation electrodes does not occur in this case, which leads to improved service life over time. An example of this is combining copper and lithium sulfate. One of said two components or both components may be provided in a nanocrystalline form.

A very particular electrode variant can be obtained when the electrode material (B) is a metal that does not react with lithium and that contains a lithium salt. In this case, too, one of said two components may have a nano-crystalline form, the other a normal-crystalline form. However, also both components may have nanocrystalline form. The matrix (A) in this variant is produced as described in the foregoing from a combination of plastic with a plasticizer that is later extracted from the paste-like mass. In this variant, however, the cavities that then occur are not subsequently closed under pressure during lamination of the electrochemically activatable layers. On the contrary, care is to be taken that they remain open. When combined with a lithium salt in the adjacent electrolyte layer, an electrode thus comprised has the property of being able to reversibly incorporate and remove lithium in the cavities that occur. It has the advantages of an intercalation electrode, but avoids the disadvantages of such an electrode (for example, expansion in volume) and has excellent electrical properties due to the large interior surface. An example of a metal that does not react with lithium is nickel.

Surprisingly it has also been demonstrated that working a phase mixture into the inventive paste-like mass, comprising Li$_4$SiO$_4$. Li$_3$PO$_4$, regardless of its intended electrochemical application, leads to an improvement in the plasticity of the electrodes or solid electrolyte produced therefrom. This requires that the phase mixture be ground extremely fine. The extremely small grain sizes must be the reason for improved internal sliding effect.

Regardless of whether the solid substance (B) is an electrode material or an electrolyte material, it can comprise one lithium ion conductor and one or more additional ion conductors (Li, Cu, Ag, Mg, F, Cl, H). Electrodes and electrolyte layers made of these substances have particularly favorable electrochemical properties such as capacity, energy density, mechanical and electrochemical stability.

The components described in the foregoing from which the inventive paste-like mass is produced can be mixed in a conventional manner, preferably by vigorously agitating or kneading the components. If necessary the organic polymer or its precursors are pre-dissolved or pre-swollen in the solvent or swelling agent before the component (B) is added. In a particular embodiment of the invention, the mass is subjected to ultrasonic treatment during the mixing process or thereafter. This causes the solid substance (B) and the conductor (C), if any, to pack more densely because the grains break up and thus decrease in size. This improves the electrical and electrochemical properties of the paste-like masses. The materials provided for the electrodes or electrolytes can also be subjected to such an ultrasonic treatment prior to being worked into the mass in order to reduce the size of the grains at the beginning of the process.

Embedding the solid substances (B) in the matrix (A) means that the powder of the electrochemically activatable substances does not have to be sintered at high temperatures, as is customary for "conventional" electrochemical elements. Such sintering would not result in the initial substances having a paste-like consistency.

The inventive paste-like masses are especially suitable for producing thin-film batteries and other similar electrochemical elements such as electrochromic structural elements. Preferably these are structural elements in so-called "thick-film" technology. The individual layers of these elements are also called "tapes". Individual electrochemically active or activatable layers are produced in thicknesses from approximately 10 µm to approximately 1 to 2 mm, placed upon one another, and brought into intimate contact. One skilled in the art will select the thickness appropriate for the application. Ranges are preferably from approximately 50 µm to 500 µm; especially preferred is a range of approximately 100 µm. However, in accordance with the invention it is also possible to produce corresponding thin-film structural elements (this term includes thicknesses of preferably 100 nm to a few µm). However, this application may be limited because corresponding elements will not satisfy current requirements in terms of capacity in a number of cases. However, it is conceivable that the application could be used for back-up chips, for instance.

The present invention therefore furthermore includes electrochemically active or activatable layers that can be produced from the paste-like masses described in the foregoing that are self-supporting or that are placed on a substrate, preferably in the thicknesses indicated. The layers are preferably flexible.

For producing both the self-supporting layers (films, tapes) and layers that can be placed on a substrate, methods known in prior art can be used that can be used for the appropriate polymer materials of the matrix. The consolidation of the paste-like masses then occurs, depending on the material, by curing (of resins or other precondensates), by cross-linking prepolymerisates or linear polymerisates, by evaporating solvents, or in a similar manner. In order to obtain self-supporting films, a suitable paste-like mass can be formed in the appropriate thickness on calendars, for example. Standard technology can be used for this. Self-supporting layers can also be formed by applying the paste-like mass to a substrate and removing the layer produced after it has consolidated. The requirement for this is that the product has sufficient flexibility. The coating process can be performed using conventional paste application methods. For instance, application can be performed by brush, rake, spraying, spin coating, etc. Pressure techniques can also be used.

In a preferred embodiment of the invention, cross-linkable resin masses (pre-condensates) are used as described above for the paste-like masses, and are cured by UV or electron radiation once the layer has been formed. Curing can naturally also be thermal or chemical (for example by immersing the produced layer in an appropriate bath). If necessary, suitable initiators or accelerators or the like are added to the masses for the cross-linking.

The present invention furthermore relates to composite layers with electrochemical properties, especially accumulators and other batteries or electrochromic elements that are formed by or include a corresponding sequence of the aforesaid layers.

Figure 1:
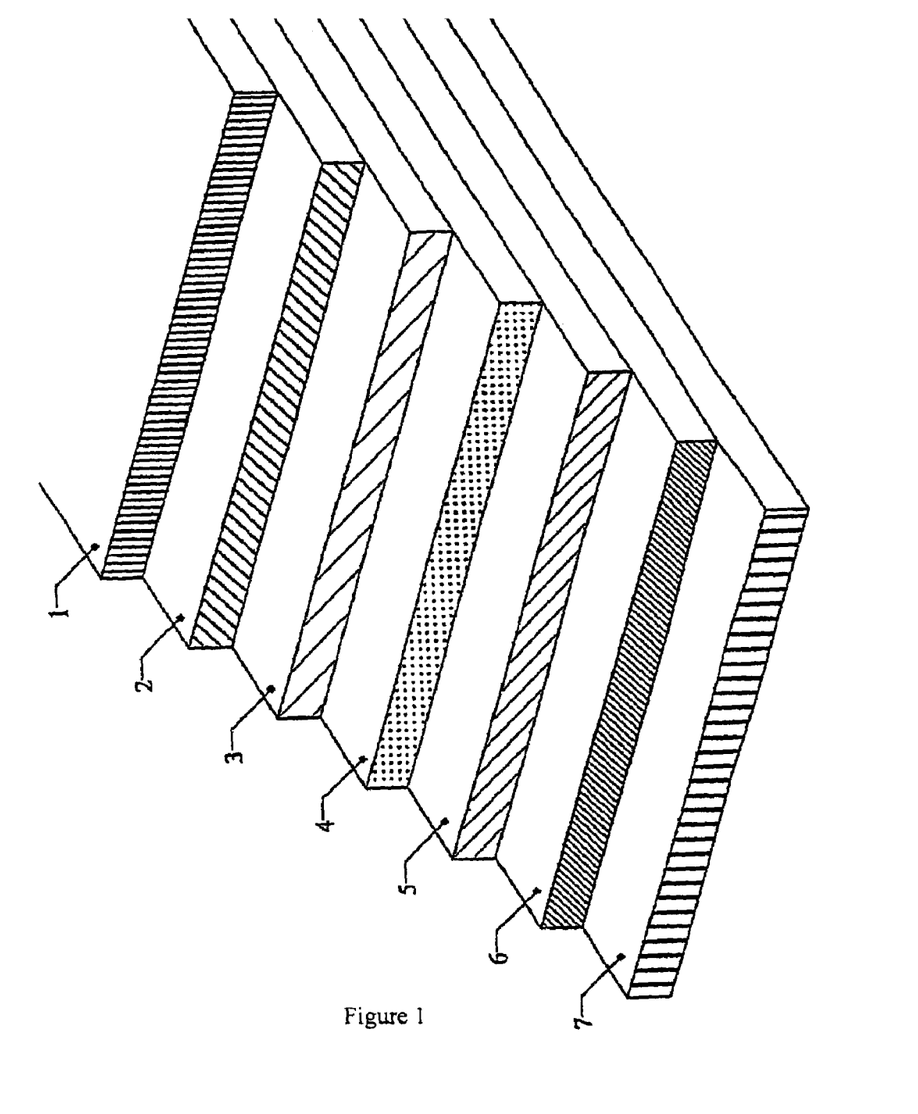

FIG. 1 illustrates the sequence of such an arrangement. The reference numerals are: contact electrode 1, intermediate tape 2, electrode 3, electrolyte 4, electrode 5, intermediate tape 6, and contact electrode 7. The following text provides a more detailed explanation.

For producing composite layers, the individual paste-like masses can be applied ply by ply upon one another by means of paste application methods. Either each individual ply can be cross-linked by itself or it can be released from solvent or made into layer form in some other manner. However, it is also possible to consolidate the individual matrices by cross-linking or evaporating the solvent or swelling agent or the like once all of the required layers have been applied. This latter is advantageous, for instance, if the individual electrochemically activatable layers are applied using a pressure method that occurs analogous to polychromy. An example of this is the flexographic printing technique, by means of which multiple meters/second of a substrate can be printed continuously with the required electrochemically activatable layers.

Alternatively, every layer or film can be converted individually into its final consolidated state. If these are self-supporting films, the appropriate components of the element to be formed can subsequently be joined together by lamination. Conventional laminating techniques can be used for this. These include, for example, extrusion coating, whereby the second layer is bonded to a carrier layer by pressure rollers, calender coating with two or three roll nips, wherein the substrate web runs in in addition to the paste-like mass, or doubling (bonding under pressure and counterpressure of preferably heated rollers). One skilled in the art will not have any problem finding the techniques that are appropriate depending on the selection of the matrices for the paste-like masses.

A pressure process during the bonding (lamination) of the individual layers can frequently be desirable, not only for improved bonding (and therefore for achieving improved conductivity) of the individual layers, but also, for instance, in order to eliminate any cavities that are present in the individual layers that had been produced, for instance, by washing out the plasticizer or the like, as described in the foregoing. Current techniques can be used for this. Cold pressing (at temperatures below 60° C.) can be advantageous if the materials used permit this. This provides particularly good contact among the individual layers.

The electrochemical parts that can be produced with the inventive paste-like masses are not limited. It is therefore understood that the embodiments described in the following are merely examples or particularly preferred embodiments.

Re-chargeable electrochemical cells can be produced in thick-layer technology in this manner, i.e., with individual electrochemically activatable layers in a thickness of approximately 10 µm to approximately 1 to 2 mm and preferably approximately 100 µm. If the electrochemical cell is to be based on lithium technology, the solid substances for the electrodes or electrolyte layers can be those substances that have already been enumerated in the foregoing for this purpose. At least three layers have to be provided, namely, one that functions as a positive electrode, one that functions as a solid body electrolyte, and one that functions as the negative electrode, i.e., layers 3, 4, and 5 in FIG. 1.

In accordance with the invention it has been demonstrated that particularly advantageous current densities can be obtained in the accumulator if certain limits are observed. As is known, current density can be adjusted by the resistance of the electrolyte. If it is too high, polarization can destroy the electrodes over the long term. If it is too low, the power of the produced accumulator is only sufficient for a few applications. The aforesaid limit is preferably 1 mA/cm$^2$. For instance, if the conductivity of an electrolyte is 10$^{-4}$ S/cm, it is particularly advantageous for the electrolyte layer to be approximately 100 µm thick. A current density of 1 mA/cm$^2$ then causes a drop in voltage, caused by the resistance, that is a negligible 0.1 V. In contrast, if the conductivity of the electrolyte is 10$^{-5}$ S/cm, for instance, the thickness of the electrolyte layer can be reduced to about 10 µm. It is therefore recommended that the layer thickness d be selected relative to conductivity $s_{ion}$ and an ionic resistance (W) and relative to the surface A such that the following formula is satisfied:

$$200\ W < d/(s_{ion} \cdot A)$$

The aforesaid three-layer cell (or any other desired electrochemical element, comprising positive electrode/electrolyte/negative electrode) can additionally be provided with contact electrodes (layers 1 and 7 in FIG. 1). It is useful that these comprise films of suitable materials (materials for contact electrodes that can be used in lithium technology are described earlier in this specification).

Figure 3:
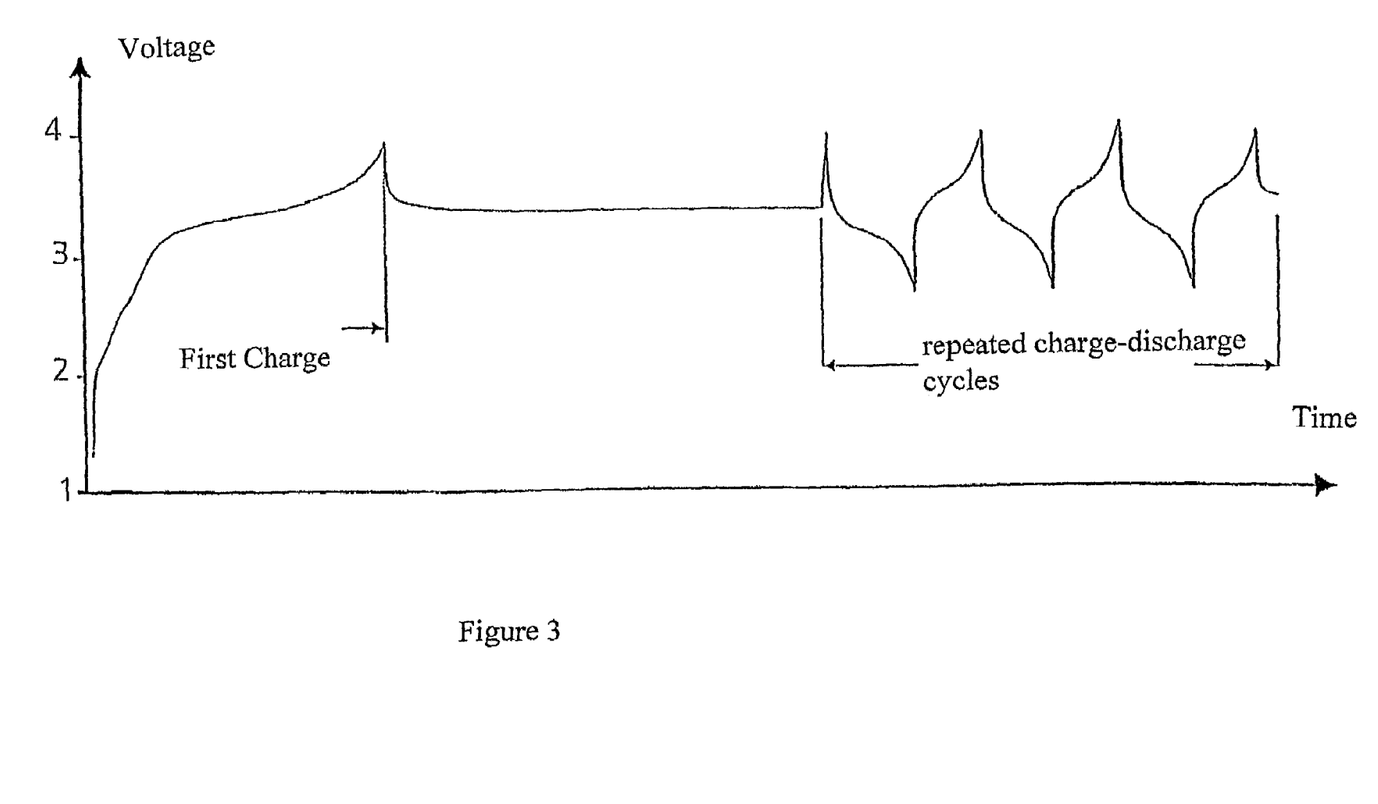

In a special embodiment of the invention, worked in between the lower contact electrode and the adjacent electrode and between the upper contact electrode and the adjacent electrode is an additional thin plastic layer ("intermediate tape", layers 2 and 6 in FIG. 1) that can also be produced using a paste-like mass of the present invention. This thin plastic layer should contain conducting metal elements or alloys of such elements that are suitable for transporting electrons from the electrode material to the contact electrode. Examples of this are the elements gold, platinum, rhodium, and carbon, or alloys of these elements, if the plastic layer is to be arranged between the positive electrode and the associated reference electrode. If it is to be arranged between the negative electrode and the contact electrode, the elements that are appropriate are nickel, iron, chromium, titanium, molybdenum, tungsten, vanadium, manganese, niobium, tantalum, cobalt, and carbon. The information provided in the foregoing about the electrodes and electrolytes also applies, of course, to the concentration and structure of the paste-like masses from which these layers are formed. An embodiment with contact electrodes and intermediate tapes (see also FIG. 1) has charge and discharge curves as illustrated in FIG. 3 if it is produced, for example using the aforesaid lithium technology.

The good adhesion properties of nanocrystalline materials to nearly all surfaces may alternatively be used to decisively improve the electrical contact between the contact electrodes with the respective electrode material in a simple manner. Thus, the arrangement of an intermediate tape as described above is advantageously not required. Said contact electrodes are realized in many accumulator systems in the form of net-shaped electrodes made for example of the metals aluminum or copper. The adhesion thereof to the electrode materials is problematic, therefore, extensive pretreatments of the nets have been described in order to improve their adhesion properties. Powdering/coating the net-shaped electrodes with nanocrystalline carbon can replace said expensive process, since the nanocrystalline carbon adheres well to said net-shaped electrodes due to its good adhesion effect, thus providing a good contact with said electrode material when said contact electrode is laminated to said electrode material.

The electrochemical structural elements of the present invention can be sealed, for example in a plastic-based housing. The weight in this case is advantageously less than that of metal housings. There are also advantages in terms of energy density.

The electrochemical composite layer (the electrochemical element) can also be embedded between two or more films made of a plastic coated with wax or paraffin. These materials act as a seal and, due to their inherent properties, can also exert mechanical pressure on the composite layer, thereby advantageously achieving improved contact in the composite layer due to the pressure.

If the electrochemical element is sealed as described in the foregoing or in some other manner, the interior can be subjected to a pre-determined water/oxygen partial pressure that effects high electrochemical stability. This can be done, for instance, by sealing the electrochemical element in such an environment with parameters that have been selected and adjusted appropriately.

If, as can be the case with some embodiments, moisture penetrates into the composite film during the course of the production process, which can have long-term undesirable consequences, the composite can be inserted in a housing or the like under a vacuum prior to sealing and, if necessary, can be subjected to an elevated temperature in order to extract the moisture.

In another embodiment of the present invention, a layer is selected for the electrolyte layer that comprises two films of differing composition that are laminated to one another, each of which having been adapted to the electrode with which it is in contact. This has a positive effect on the stability of the phase limits between positive electrode and electrolyte 1 and between negative electrode and electrolyte 2. A concrete example of this embodiment is using lithium iodide for the electrolyte material in the first layer and $Li_{1.3}Al_{0.3}Ti_{1.7}(PO_4)_3$ for the electrolyte material in the second layer.

An example of a galvanic cell with electrochromic properties would be a series of layers comprising the following sequence:

Conductor 1/Y/MeX-alcoholate/$WO_3$/Conductor 2

In this sequence the metal Me can be selected from among, for example, lithium, sodium, potassium, rubidium, and cesium, and its anion X from among, for example, the halogenides chloride, bromide, and iodide. Conductor 1 can be selected from among, for example, indium tin oxide (ITO), zinc aluminum oxide ($Zn_xAl_yO_z$) and silver. Conductor 2 can be selected from among, for example, indium tin oxide (ITO) and zinc aluminum oxide ($Zn_xAl_yO_z$).

Figure 2:
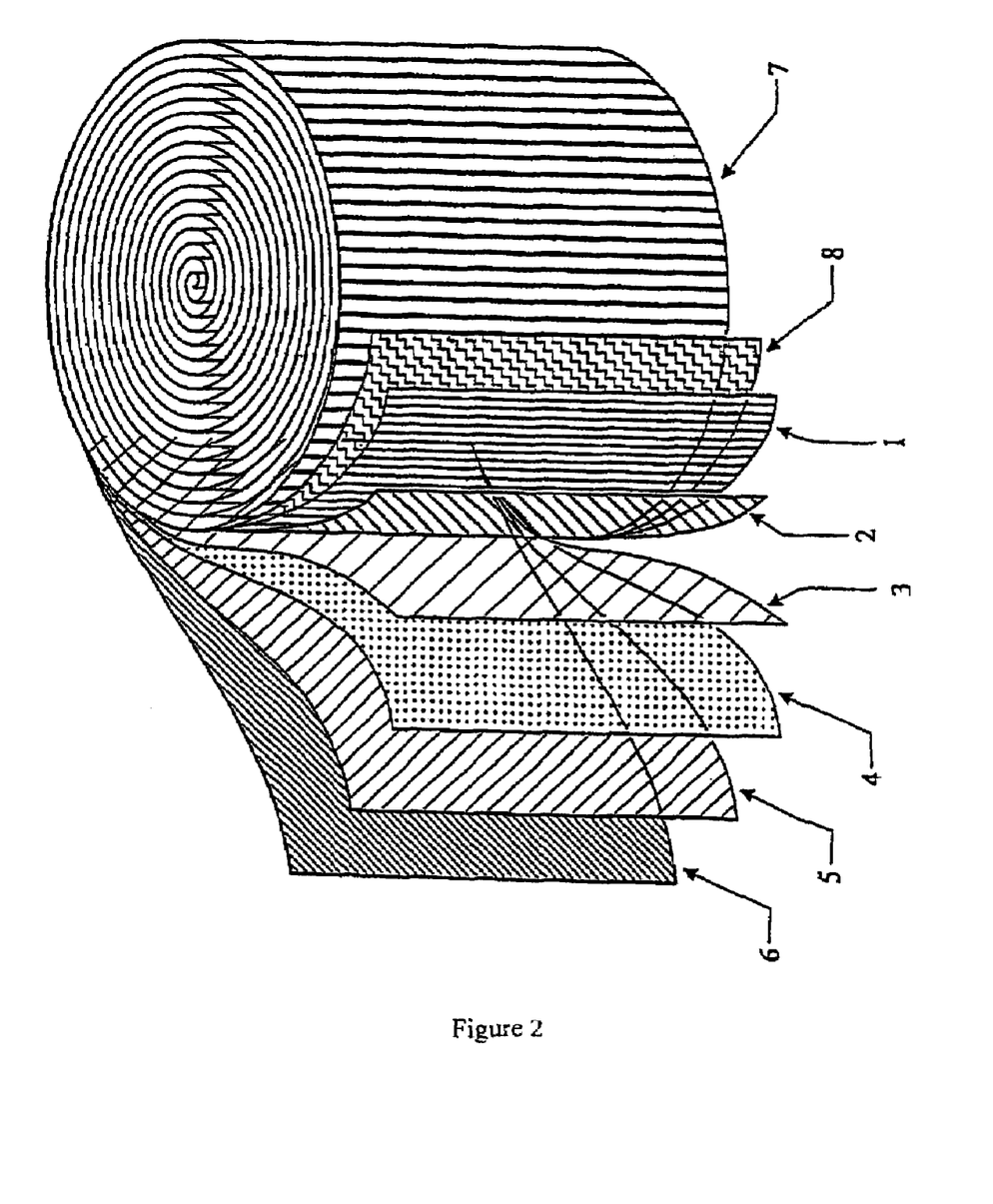

The inventive sequences of layers for the electrochemical structural elements can be arranged in any desired shape. For instance, the flexible composite layer can be rolled up, which achieves particularly advantageous geometry for compact accumulators. If the accumulator has a small volume, this provides a very large active battery surface. FIG. 2 illustrates such an embodiment, whereby reference numbers 1 through 7 indicate the same items as in FIG. 1 and reference number 8 indicates an insulating layer.

Non-self-supporting composite layers can also be applied to solid bases like walls for integrated energy storage (self-supporting composite films can of course also be applied or affixed thereto). In this case it is possible to take advantage of large surface areas. The accumulators themselves are not associated with a space requirement. A special example of an embodiment of this type is the integration of composite layers for accumulators in substrates for solar cells. Independent energy supply units can be created in this manner. Layer sequences for accumulators can also be applied to solid or flexible substrates in order to be used as integrated energy storage in electronic structures.

The concrete examples in the following provide a more detailed explanation of the invention.

EXAMPLE 1

Preparation of a Mixture of Normal Crystalline and Nanocrystalline Material

LiCl, $TiCl_3$ and $AlCl_3$ are dissolved in water. $Li_{1.3}Al_{0.3}Ti_{1.7}(PO_4)_3$ that is only hardly soluble in water is added as electrolyte material with standard grain size and agitated in said liquid. Upon introducing $Na_3(PO_4)$ and hydrogen peroxide into said solution, an oxidation of the titanium to oxidation state IV and a precipitation reaction wherein nanocrystalline $Li_{1.3}Al_{0.3}Ti_{1.7}(PO_4)_3$ precipitates as hardly soluble component take place after a prolonged time of agitation and/or increase in temperature. After filtration or sedimentation, a mixture of normal crystalline and nanocrystalline $Li_{1.3}Al_{0.3}Ti_{1.7}(PO_4)_3$ is obtained that can be further processed as ion conductor in different manners.

EXAMPLE 2

Preparation of a Supercap (a) 6g activated carbon, 1.2 g acetylene black, 1.8 g PVDF/HFP and 0.6 g ethylene carbonate are prepared in 60 g acetone. The mixture is heated to 100° C. under agitation, then cooled down to 50° C. and agitated at said temperature for about 4 hours. Thereafter it is carefully concentrated until the desired consistency is achieved. From this paste-like mass, an electrode film is extruded in a usual manner.

(b) 9 g of the material of example 1, 0.9 g ethylene carbonate and 3.0 g PVFD/HFP are prepared in 40 g acetone. The mixture is treated as described under a). From the paste-like mass, an electrolyte film is extruded.

(c) Two copper contact nets are laminated each with one electrode film prepared according to (a). The electrolyte film according to (b) is placed between said two films and all layers are laminated to a supercap.

EXAMPLE 3

Transparent Film for Use as Electrochromic Indicating Element (e.g. Display)

6 g nanocrystalline $TiO_2$, 1.2 g acetylene, 1.8 g PVDF/HFP and 0.6 g ethylene carbonate are prepared in 60 g acetone. The mixture is heated to 100° C. under agitation, then cooled down to 50° C. and agitated at said temperature for about 4 hours. Thereafter it is carefully concentrated until the desired consistency is achieved. From this paste-like mass, a transparent film is extruded in a usual manner.

EXAMPLES 4 AND 5

Example 3 was repeated with the proviso that the titanium dioxide was replaced by an equal quantity of nanocrystalline $WO_3$ or $MoO_3$. The properties of the film obtained are comparable.

EXAMPLE 6

Production of a Lithium Cell a) A film serving as a positive electrode was prepared according to the formulation of example 2a, wherein the activated carbon was, however, replaced by 6 g nanocrystalline $LiCoO_2$.

b) A film serving as a negative electrode was prepared according to the same formulation, wherein the activated carbon was, however, replaced by 6 g nanocrystalline SnO.
c) An electrolyte film was produced as described in example 2b.
d) The three films were laminated together. A lithium cell is obtained wherein the positive electrode, upon intercalation of lithium, forms a Su—Li alloy and Li$_2$O, the alloy itself being present in an extremely finely dispersed form due to the nanocrystalline form of the SnO.

EXAMPLE 7

Example 6 was repeated, however using zinc oxide instead of SnO. The result is comparable.

The invention claimed is:

1. A paste-like mass that can be used for preparation of a solid electrolyte material in electrochemical elements, comprising a mixture of:
   (A) 0-70% by weight of a matrix containing at least one organic polymer, precursors thereof, or prepolymers thereof, and
   (B) 30-100% by weight of a material selected from the group consisting of an inorganic solid body electrolyte and an inorganic ionic intermediate conductor, that is not soluble in said matrix and that is in the form of a solid substance, and additionally, a suspending agent for (B), characterized in that said material suitable as an inorganic solid body electrolyte or as an inorganic ionic intermediate conductor is at least partially a nanocrystalline powder.

2. The paste-like mass in accordance with claim 1, characterized in that said material is partially nanocrystalline and is chemically identical with the remaining material or is chemically different therefrom.

3. The paste-like mass in accordance with claim 1, characterized in that the quantity of said nanocrystalline powder is at least 30% by weight of said material.

4. The paste-like mass in accordance with claim 1, characterized in that said matrix (A) also contains a plasticizer.

5. The paste-like mass in accordance with claim 1, characterized in that said matrix (A) contains a cross-linkable, liquid or soft resin.

6. The paste-like mass in accordance with claim 5, characterized in that said resin is a cross-linkable addition polymer and condensation resin, selected from the group consisting of aminoplasts, phenoplasts, epoxy resins, polyesters, polycarbamates, and methyl methacrylate reaction resins.

7. The paste-like mass in accordance with claim 1, characterized in that said organic polymer of said matrix (A) is a natural polymer, synthetic polymer or mixture thereof, selected from the group consisting of natural and synthetic polysaccharides, proteins, resins, waxes, and halogenated and non-halogenated rubbers, thermoplasts, and thermoelastomers.

8. A self-supporting electrolyte layer or layer that is placed on a substrate, comprising a heterogeneous mixture of
   (A) 0-70% by weight of a matrix containing at least one organic polymer and
   (B) 30-100% by weight of a material selected from the group consisting of an inorganic solid body electrolyte and an inorganic ionic intermediate conductor, that is not soluble in said matrix and that is in the form of a solid substance, characterized in that said material is at least partially a nanocrystalline powder, and wherein said layer is a flexible layer.

9. The self-supporting layer or layer that is placed on a substrate in accordance with claim 8, characterized in that said material (B) is a solid electrolyte and the layer has a thickness (d) that satisfies the following formula:

$$200\Omega < d/(s_{ion} * A)$$

10. A self-supporting composite layer or composite layer that is placed on a substrate with electrochemical properties, comprising at least two layers acting as an electrode and one layer acting as an electrolyte, wherein the layer acting as an electrolyte comprises a heterogeneous mixture of
    (A) 0-70% by weight of a matrix containing at least one organic polymer and
    (B) 30-100% by weight of a material selected from the group consisting of an inorganic solid body electrolyte and an inorganic ionic intermediate conductor, that is not soluble in said matrix and that is in the form of a solid substance, characterized in that said material is at least partially a nanocrystalline powder.

11. The self-supporting composite layer or composite layer that is placed on a substrate in accordance with claim 10, wherein said two electrodes are a positive and a negative electrode, or equally directed electrodes.

12. The composite layer with electrochemical properties in accordance with claim 11, characterized in that also applied to the layer with positive electrode material is a layer acting as lower contact electrode and to the layer with negative electrode material is a layer acting as upper contact electrode.

13. The composite layer with electrochemical properties in accordance with claim 12, characterized in that nanocrystalline carbon is present between said layer acting as lower contact electrode and said layer with positive electrode material or between said layer acting as upper contact electrode and said layer with negative electrode material.

14. The paste-like mass in accordance with claim 3, characterized in that the quantity of said nanocrystalline powder is at least 70% by weight of said material.

15. The paste-like mass in accordance with claim 3, characterized in that the quantity of said nanocrystalline powder is at least 85% by weight of said material.

16. The paste-like mass in accordance with claim 3, characterized in that the quantity of said nanocrystalline powder is at least 90% by weight of said material.

17. A paste-like mass that can be used for preparation of a solid electrolyte material in electrochemical elements, comprising a mixture of:
    (A) 0-70% by weight of a matrix containing at least one organic polymer, precursors thereof, or prepolymers thereof, and
    (B) 30-100% by weight of a material selected from the group consisting of an inorganic solid body electrolyte and an inorganic ionic intermediate conductor, that is not soluble in said matrix and that is in the form of a solid substance, characterized in that said material is at least partially a nanocrystalline powder.

18. The paste-like mass in accordance with claim 17, characterized in that said material is partially nanocrystalline and is chemically identical with the remaining material or is chemically different therefrom.

19. The paste-like mass in accordance with claim 17, characterized in that the quantity of said nanocrystalline powder is at least 30% by weight of said material.

20. The paste-like mass in accordance with claim 17, characterized in that said matrix (A) also contains a plasticizer.

21. The paste-like mass in accordance with claim 17, characterized in that said matrix (A) contains a cross-linkable, liquid or soft resin.

22. The paste-like mass in accordance with claim 21, characterized in that said resin is a cross-linkable addition polymer and condensation resin, selected from the group consisting of aminoplasts, phenoplasts, epoxy resins, polyesters, polycarbamates, and methyl methacrylate reaction resins.

23. The paste-like mass in accordance with claim 17, characterized in that said organic polymer of said matrix (A) is a natural polymer, synthetic polymer or mixture thereof, selected from the group consisting of natural and synthetic polysaccharides, proteins, resins, waxes, and halogenated and non-halogenated rubbers, thermoplasts, and thermoelastomers.

24. The paste-like mass in accordance with claim 19, characterized in that the quantity of said nanocrystalline powder is at least 70% by weight of said material.

25. The paste-like mass in accordance with claim 19, characterized in that the quantity of said nanocrystalline powder is at least 85% by weight of said material.

26. The paste-like mass in accordance with claim 19, characterized in that the quantity of said nanocrystalline powder is at least 90% by weight of said material.

\* \* \* \* \*

UNITED STATES PATENT AND TRADEMARK OFFICE
CERTIFICATE OF CORRECTION

PATENT NO. : 7,479,350 B1
APPLICATION NO. : 09/959169
DATED : January 20, 2009
INVENTOR(S) : Neumann et al.

It is certified that error appears in the above-identified patent and that said Letters Patent is hereby corrected as shown below:

On Title Page; item (54), and Column 1, lines 3 and 4
In the Title, delete "ELECTROMECHANICAL" and replace with
--ELECTROCHEMICAL--.

Signed and Sealed this

Twenty-sixth Day of May, 2009

JOHN DOLL
*Acting Director of the United States Patent and Trademark Office*